US012486476B2

(12) United States Patent
Lu et al.

(10) Patent No.: US 12,486,476 B2
(45) Date of Patent: Dec. 2, 2025

(54) WARE WASHING SOLUTION CONTAINING OXIDIZED STARCH

(71) Applicant: ECOLAB USA INC., Saint Paul, MN (US)

(72) Inventors: Xin Lu, Shanghai (CN); Chunyang Li, Shanghai (CN); Jinming Zhang, Shanghai (CN)

(73) Assignee: ECOLAB USA INC., Saint Paul, MN (US)

( * ) Notice: Subject to any disclaimer, the term of this patent is extended or adjusted under 35 U.S.C. 154(b) by 716 days.

(21) Appl. No.: 17/753,752

(22) PCT Filed: Sep. 30, 2019

(86) PCT No.: PCT/CN2019/109457
§ 371 (c)(1),
(2) Date: Mar. 14, 2022

(87) PCT Pub. No.: WO2021/062632
PCT Pub. Date: Apr. 8, 2021

(65) Prior Publication Data
US 2022/0372409 A1 Nov. 24, 2022

(51) Int. Cl.

| | |
|---|---|
| ***C11D 3/22*** | (2006.01) |
| ***C11D 1/72*** | (2006.01) |
| ***C11D 1/722*** | (2006.01) |
| ***C11D 3/04*** | (2006.01) |
| ***C11D 3/12*** | (2006.01) |
| ***C11D 3/20*** | (2006.01) |
| ***C11D 3/37*** | (2006.01) |
| ***C11D 3/386*** | (2006.01) |

(52) U.S. Cl.
CPC ................ *C11D 3/223* (2013.01); *C11D 1/72* (2013.01); *C11D 3/1213* (2013.01); *C11D 3/38609* (2013.01); *C11D 2111/14* (2024.01)

(58) Field of Classification Search
None
See application file for complete search history.

(56) References Cited

U.S. PATENT DOCUMENTS

| | | | | |
|---|---|---|---|---|
| 3,941,710 | A * | 3/1976 | Gilbert | C11D 3/08 510/491 |
| 5,565,556 | A | 10/1996 | Heinzman et al. | |
| 2002/0068688 | A1* | 6/2002 | Callaghan | C11D 3/39 510/447 |
| 2010/0144576 | A1 | 6/2010 | Klein et al. | |
| 2013/0150277 | A1* | 6/2013 | Fischer | C11D 3/386 510/230 |
| 2015/0218495 | A1* | 8/2015 | Miralles | C11D 9/08 134/25.2 |
| 2016/0010040 | A1* | 1/2016 | Pandey | C11D 17/0073 510/225 |
| 2017/0002295 | A1* | 1/2017 | Arhancet | C07C 323/52 |
| 2017/0073619 | A1* | 3/2017 | Skagerlind | C11D 3/06 |
| 2017/0275569 | A1* | 9/2017 | Pegelow | C11D 3/38618 |
| 2018/0201876 | A1 | 7/2018 | Garcia Marcos et al. | |

FOREIGN PATENT DOCUMENTS

| | | | |
|---|---|---|---|
| CA | 2038640 | A1 | 9/1991 |
| CA | 2316591 | A1 | 2/2001 |
| CN | 103571649 | A | 2/2014 |
| DE | 69229301 | T2 | 12/1999 |
| JP | H10195488 | A | 7/1998 |
| WO | 9405762 | A1 | 3/1994 |
| WO | WO 9614386 | A1 * | 5/1996 |

OTHER PUBLICATIONS

International Searching Authority in connection with PCT/CN2019/109457 filed Sep. 30, 2019, "The International Seach Report and the Written Opinion of the International Searching Authority, or the Declaration", 9 pages, mailed Jul. 8, 2020.

* cited by examiner

*Primary Examiner* — Lorna M Douyon
(74) *Attorney, Agent, or Firm* — McKee, Voorhees & Sease, PLC

(57) ABSTRACT

Consumer and industrial 2-in-1 alkaline ware washing compositions providing both detergency and rinseability in a single cleaning composition are disclosed. Further benefits can be achieved with low levels of rinse aid surfactants in a rinse additive following the alkaline ware washing composition, including levels of rinse additive surfactant of about 500 ppm surfactant or less. Alkaline ware washing compositions and methods of using the same provide user-friendly, solid, ware washing compositions without the need for using a separate rinse aid composition.

17 Claims, No Drawings

WARE WASHING SOLUTION CONTAINING OXIDIZED STARCH

CROSS REFERENCE TO RELATED APPLICATIONS

This is a U.S. National Phase application claiming priority to PCT/CN2019/109457, filed Sep. 30, 2019, the entire contents of which are hereby expressly incorporated by reference in their entirety including, without limitation, the specification, claims, and abstract, as well as any figures, tables, or drawings thereof.

FIELD OF THE INVENTION

The invention relates to 2-in-1 alkaline ware washing compositions providing both detergency and rinse aid efficacy in a single cleaning composition. In particular, compositions and methods of using the same provide a user-friendly, solid, detergent composition without the need for using a separate rinse aid composition and which are suitable for consumer and industrial applications. In further aspects, still further benefit can optionally be obtained from combining the ware washing composition with low levels of rinse aid surfactants in a rinse additive following the alkaline ware washing composition, including levels of rinse additive surfactant of about 500 ppm surfactant or less.

BACKGROUND OF THE INVENTION

Conventional machine ware wash in the industrial space utilizes two products to achieve clean, dry, spot free ware: detergent and rinse aid. These two products are distinct in that typically the detergent is dispensed in the wash step and the rinse aid during the rinse step. Alkaline detergents are extensively used in both consumer and industrial dish machines as they effectively remove and emulsify fatty, oily, hydrophobic soils. However, alkaline detergents require the second component, the rinse aid to prevent the formation of films on substrate surfaces contacted by the alkaline detergent. Filming is caused in part by using alkaline detergents in combination with certain water types (including hard water), and water temperatures. A solution to the generation of hard water films has been to employ rinse aids to remove such films. Additionally, rinse aids are used in a rinse cycle following the wash cycle to enhance drying time, as well as reduce any cleaning imperfections (including the removal of films). Additional benefits and methods of using rinse aids are described in U.S. Pat. No. RE 38262, which is herein incorporated by reference in its entirety. The addition of rinse aids to a ware wash rinse cycle often requires additional wall space for the installation of both a detergent dispenser and a rinse aid dispenser.

However, the need for rinse aids increases the cost associated with alkaline detergents for both the formulation of the cleaning compositions as well as the additional costs associated with heated water for rinsing steps. This is an important limitation in the use of two-part cleaning systems, as in many industrial settings undercounter dish machines are typically used in kitchens where space is limited. Such applications of ware washing that have limited space available for the ware washing and dispensing machines have very little space for the chemistry itself. Often it is stored on the floor. This presents a major safety hazard in a high traffic area of the kitchen. Accordingly, is a desire to have space-saving solutions for compact sized kitchens, and other ware washing applications having this constraint.

Typically, detergent compositions for ware washing contain a builder material which serves a variety of functions, including water hardness sequestration, soil peptization, pH control, and the like. The development of high-performance detergent compositions involves additional considerations and challenges in formulating phosphate-free compositions. From a performance standpoint, the sequestering builders in phosphate-free composition may not optimally peptize soils or otherwise act as a dispersing agent and/or anti-redeposition agent for soil removal. In the dishwashing industry, lime scale deposition on dishes and glassware remains problematic.

For many years, sodium tripolyphosphate was the builder of choice and, by itself, could perform the aforesaid functions. However, in recent years sodium tripolyphosphate has been removed from many detergent compositions in light of concerns surrounding its environmental impact. Countries have been actively looking to replace sodium tripolyphosphate detergent builders. Currently, many fully formulated detergent compositions contain a zeolite builder, a polycarboxylate builder, or mixtures thereof. The use of starches, including oxidized starches as building agents are known, however such chemistries have not been used for wetting/sheeting/drying in any 2-in-1 alkaline ware washing compositions.

There is a need for alternative, effective alkaline ware washing compositions that include use of modified starches for wetting/sheeting/drying in 2-in-1 alkaline ware washing compositions, as the starches provide an alternative in providing low cost, biodegradable, and renewable raw materials.

There is also a need for alternative, effective alkaline ware washing compositions that provide the desired cleaning results and at the same time reduce the number of components required for cleaning and rinsing.

It is an objective to develop an alkaline ware washing composition that provides good cleaning performance and good rinseability without requiring a rinse aid composition or separate step to employ a rinse aid in the rinse cycle.

A further objective is to provide a solid ware wash composition that provides both the detergent and rinse aid 2-in-1 composition for applications that do not have space for dual detergent and rinse aid dispensing.

Other objects, advantages and features of the present invention will become apparent from the following specification taken in conjunction with the accompanying drawings.

BRIEF SUMMARY OF THE INVENTION

In an embodiment, an alkaline ware washing composition comprises: an alkalinity source, an oxidized starch, at least one builder, water conditioning agent, and a nonionic surfactant, wherein the composition provides at least substantially similar cleaning, sheeting and drying as separate detergent and rinse aid compositions that do not include the oxidized starch and nonionic surfactant.

In another embodiment, a method of cleaning and rinsing ware comprises: contacting ware with an alkaline ware washing composition comprising an oxidized starch, an alkalinity source, at least one builder, a water conditioning polymer; and a nonionic surfactant, and rinsing said ware with water, wherein said alkaline ware washing composition provides at least substantially similar cleaning, sheeting and drying as separate detergent and rinse aid compositions that do not include the oxidized starch and nonionic surfactant.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION OF THE PREFERRED EMBODIMENT

The alkaline ware washing compositions provide suitable cleaning and rinseability to provide an effective 2-in-1 composition. The embodiments described herein are not limited to particular alkaline detergents, which can vary and are understood by skilled artisans based upon the disclosure provided herein. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" refers to a straight or branched chain monovalent hydrocarbon group optionally containing one or more heteroatomic substitutions independently selected from S, O, Si, or N. Alkyl groups generally include those with one to twenty atoms. Alkyl groups may be unsubstituted or substituted with those substituents that do not interfere with the specified function of the composition. Substituents include alkoxy, hydroxy, mercapto, amino, alkyl substituted amino, or halo, for example. Examples of "alkyl" as used herein include, but are not limited to, methyl, ethyl, n-propyl, n-butyl, n-pentyl, isobutyl, isopropyl, and C8-C20 alkyl chains and the like. In addition, "alkyl" may include "alkylenes", "alkenylenes", or "alkylynes".

As used herein, the term "alkylene" refers to a straight or branched chain divalent hydrocarbon group optionally containing one or more heteroatomic substitutions independently selected from S, O, Si, or N. Alkylene groups generally include those with one to twenty atoms. Alkylene groups may be unsubstituted or substituted with those substituents that do not interfere with the specified function of the composition. Substituents include alkoxy, hydroxy, mercapto, amino, alkyl substituted amino, or halo, for example. Examples of "alkylene" as used herein include, but are not limited to, methylene, ethylene, propane-1,3-diyl, propane-1,2-diyl and the like.

As used herein, the term "alkenylene" refers to a straight or branched chain divalent hydrocarbon group having one or more carbon-carbon double bonds and optionally containing one or more heteroatomic substitutions independently selected from S, O, Si, or N. Alkenylene groups generally include those with one to twenty atoms. Alkenylene groups may be unsubstituted or substituted with those substituents that do not interfere with the specified function of the composition. Substituents include alkoxy, hydroxy, mercapto, amino, alkyl substituted amino, or halo, for example. As used herein, the term "alkylyne" refers to a straight or branched chain divalent hydrocarbon group having one or more carbon-carbon triple bonds and optionally containing one or more heteroatomic substitutions independently selected from S, O, Si, or N. Alkylyne groups generally include those with one to twenty atoms. Alkylyne groups may be unsubstituted or substituted with those substituents that do not interfere with the specified function of the composition. Substituents include alkoxy, hydroxy, mercapto, amino, alkyl substituted amino, or halo, for example.

As used herein, the term "alkoxy", refers to —O-alkyl groups wherein alkyl is as defined above. As used herein, the term "cleaning" refers to a method used to facilitate or aid in soil removal, bleaching, microbial population reduction, and any combination thereof.

As used herein, the term "polymer" generally includes, but is not limited to, homopolymers, copolymers, such as for example, block, graft, random and alternating copolymers, terpolymers, and higher "x" mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

As used herein, the term "soil" or "stain" refers to a polar or non-polar substances which may or may not contain particulate matter such as, but not limited to mineral clays, sand, natural mineral matter, carbon black, graphite, kaolin, environmental dust and food soils such as polyphenols starches, proteins, oils and fats, etc.

The term "substantially similar performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both. As referred to herein, substantially similar performance includes both the cleaning/soil removal and rinsing of the 2-in-1 alkaline ware washing compositions in comparison to a conventional two-part system including both a first alkaline cleaning composition and a second separate rinse aid composition. In other embodiments, the substantially similar performance includes both the cleaning/soil removal and rinsing of the 2-in-1 alkaline ware washing compositions along with a slight amount, as described herein, of rinse aid following the ware washing composition in comparison to a conventional two-part system including both a first alkaline cleaning composition and a second separate rinse aid composition containing conventional amounts of the rinse aid surfactant.

The term "viscosity" refers to the thickness of a composition as a result of internal friction of the formulation. Viscosity is a measurement of the resistance of the fluid to deformation under shear stress and can be measured by conventional standard methods including Brookfield Viscometer, DV-II spindle 2, 30 rpm, 20 degrees C. (approximately 68° F.), or NDJ-79, 6%, 95 degrees C. for 1 hour.

As used herein, the term "ware" refers to items such as eating and cooking utensils, and dishes. As used herein, the term "ware washing" refers to washing, cleaning, or rinsing ware. Ware also refers to items made of plastic. Types of plastics that can be cleaned with the compositions according to the invention include but are not limited to, those that include polycarbonate polymers (PC), acrilonitrile-butadiene-styrene polymers (ABS), and polysulfone polymers (PS). Other exemplary plastics that can be cleaned using the compounds and compositions of the invention include polyethylene terephthalate (PET) and plastics from melamine resin.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present invention may comprise, consist essentially of, or consist of the components and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Alkaline Ware Washing Compositions

Exemplary ranges of the alkaline ware washing compositions described herein are shown in Table 1 in weight percentage of the solid compositions.

TABLE 1

| Material | First Exemplary Range wt-% | Second Exemplary Range wt-% | Third Exemplary Range wt-% | Fourth Exemplary Range wt-% |
|---|---|---|---|---|
| Oxidized Starch | 0.1-30 | 1-30 | 1-20 | 5-15 |
| Alkalinity Source | 10-90 | 25-90 | 40-95 | 50-80 |
| Builders | 0.1-50 | 1-30 | 1-20 | 1-10 |
| Water conditioning Polymer | 1-50 | 1-40 | 1-20 | 1-10 |
| Nonionic Surfactant | 0.1-30 | 0.1-25 | 1-20 | 1-10 |
| Water | 0-20 | 0-15 | 0-12 | 1-12 |
| Additional Functional Ingredients | 0-40 | 0-30 | 0-25 | 0-20 |

Oxidized Starch

The alkaline ware washing compositions include an oxidized starch. Oxidized starch is easily degraded by microorganisms in the natural environment, having higher biodegradability than other polymer compounds. Benefits of incorporating oxidized starch into the alkaline ware washing compositions include, but are not limited to, its low cost, biodegradability, renewable resources, good performance, low viscosity, reduced film formation, enhanced sheeting and drying, effective adhesion, and the like. In embodiments, the oxidized starch has a viscosity of from about 1 to about 50 mPa·S at 95° C.

Oxidized starches can be obtained by processes involving the oxidation of starch with a suitable oxidizing agent comprising hydrogen peroxide, ammonium sulfate, peroxycarboxylic acids, alkali metal hypochlorites, dichromates, or permanganates, or a combination thereof. Examples of suitable oxidizing agents comprise sodium hypochlorite, potassium dichromate, potassium permanganate, sodium permanganate, peroxyacetic acid, hydrogen peroxide, or a combination thereof. In an embodiment, a builder is further included in in the oxidation reaction. Examples of suitable builders comprise 4A zeolite, sodium silicate, polyacrylic acid, sodium metasilicate, or a mixture thereof. In other embodiments, the oxidized starch is prepared using nitric acid and sulfuric acid, preferably in the presence of a vanadium catalyst and $NO_2$ as an initiator.

In embodiments, the starch involved in the oxidation reaction comprise a source of polyglucosidic starch, such as any one of tapioca starch, corn starch, potato starch, rice starch, arrowroot starch, wheat starch, other vegetable starches, or a mixture thereof. In preferred embodiments, the oxidized starch is an odorless, white powder, having a size of 50 to 100 mesh (also referred to as fineness %). While the starch may be oxidized under acid, alkaline, or neutral conditions, the oxidized starch may have a pH in a solution in the range of about 5 to about 9. Preferably, the pH of the oxidized starch in a solution is in the range of about 6 to about 8, and most preferably around about 7. The powder oxidized starch can further comprise water in the amount of from about 2 wt-% to about 25 wt-%, more preferably from about 5 wt-% to about 20 wt-%, and most preferably from about 7 wt-% to about 15 wt-%.

The resulting oxidized starch product may contain carboxyl or carbonyl groups. In further embodiments, the oxidized starch is an oxidized starch polymer comprising (a) at least 60 mole percent of the C6 position of the starch glucoside units oxidized to carboxyl groups; (b) from about 5 to about 40 mole percent of the C2-C3 positions, oxidized to carboxyl groups; and (c) no more than about 40 mole percent of unoxidized C6 moieties. Preferred oxidized starch polymers comprise (a) from about 70 to 90 mole percent C6 moieties oxidized to carboxyl; (b) from about 20 to 35 mole percent C2-C3 moieties oxidized to carboxyl; and (c) from about 10 to 30 mole percent unoxidized C6 moieties.

The oxidized starch polymer has a minimum molecular weight of about 500 and a maximum molecular weight of about 60,000, preferably from about 1,500 to about 20,000, and most preferably from about 3,000 to about 10,000.

In an aspect, the alkaline ware washing compositions include from about 0.1 wt-% to about 30 wt-% oxidized starch, from about 1 wt-% to about 25 wt-% oxidized starch, from about 1 wt-% to about 20 wt-% oxidized starch, or from about 5 wt-% to about 15 wt-% oxidized starch. In addition, without being limited according to the invention, all ranges recited are inclusive of the numbers defining the range and include each integer within the defined range.

Alkalinity Source

The alkaline ware washing composition includes an alkalinity source. Examples of suitable alkalinity sources of the cleaning composition include, but are not limited to carbonate-based alkalinity sources, including, for example, carbonate salts such as alkali metal carbonates; caustic-based alkalinity sources, including, for example, alkali metal hydroxides; other suitable alkalinity sources may include metal silicate, metal borate, and organic alkalinity sources.

In an embodiment, the alkalinity source comprises an alkali metal hydroxide. Examples of suitable alkalinity sources include but are not limited to: alkali metal hydroxides, such as sodium hydroxide, potassium hydroxide, and the like.

In an embodiment, the alkalinity source comprises an alkali metal carbonate. Examples of suitable alkalinity sources include but are not limited to: alkali metal carbonates, such as sodium carbonate, potassium carbonate, bicarbonate, sesquicarbonate, and mixtures thereof.

An effective amount of one or more alkaline sources should be considered as an amount that controls the pH of the resulting use solution when water is added to the detergent composition to form a use solution. The pH of the use solution must be maintained in the alkaline range in order to provide sufficient detergency properties. In one embodiment, the pH of the use solution is between about 9 and about 13. If the pH of the use solution is too low, for example, below about 9, the use solution may not provide adequate detergency properties. If the pH of the use solution is too high, for example, above about 13, the use solution may be too alkaline and attack or damage the surface to be cleaned. In a preferred embodiment, the pH of a use solution is between about 10 to about 12, or preferably between about 10 to about 11.

In an aspect, the alkaline detergent compositions include from about 10 wt-% to about 95 wt-% alkalinity source, from about 25 wt-% to about 90 wt-% alkalinity source, from about 40 wt-% to about 90 wt-% alkalinity source, from about 50 wt-% to about 80 wt-% alkalinity source, or from about 50 wt-% to about 70 wt-% alkalinity source. In addition, without being limited according to the invention, all ranges recited are inclusive of the numbers defining the range and include each integer within the defined range.

Builders

The alkaline ware washing composition can include one or more building agents, also called chelating or sequestering agents (e.g. builders) to treat or soften water and to prevent formation of precipitates or other salts. These may include, but are not limited to: condensed phosphates, alkali metal carbonates, alkali metal silicates and metasilicates, phosphonates, aminocarboxylic acids, polycarboxylic acid polymers and/or alkali metal gluconates, including sodium gluconate. In general, a chelating agent is a molecule capable of coordinating (i.e. binding) the metal ions commonly found in natural water to prevent the metal ions from interfering with the action of the other detersive ingredients of a cleaning composition.

Examples of phosphonates include, but are not limited to: 2-phosphonobutane-1,2,4-tricarboxylic acid (PBTC), 1-hydroxyethane-1,1-diphosphonic acid, $CH_2C(OH)[PO(OH)_2]_2$, aminotri(methylenephosphonic acid), $N[CH_2PO(OH)_2]_3$; aminotri(methylenephosphonate), sodium salt (ATMP), $N[CH2PO(ONa)_2]_3$; 2-hydroxyethyliminobis(methylenephosphonic acid), $HOCH_2CH_2N[CH_2PO(OH)_2]_2$; diethylenetriaminepenta(methylenephosphonic acid), $(HO)_2POCH_2N[CH_2CH_2N[CH_2PO(OH)_2]_2]_2$, diethylenetriaminepenta(methylenephosphonate), sodium salt (DTPMP), $C_9H_{(28-x)}N_3Na_xO_{15}P_5$ (x=7); hexamethylenediamine(tetramethylenephosphonate), potassium salt, $C_{10}H_{(28-x)}N_2KxO_{12}P_4$ (x=6); bis(hexamethylene)triamine(pentamethylenephosphonic acid), $(HO_2)POCH_2N[(CH_2)_2N[CH_2PO(OH)_2]_2]_2$, and phosphorus acid, $H_3PO_3$. A preferred phosphonate combination is ATMP and HEDP. A neutralized or alkali phosphonate, or a combination of the phosphonate with an alkali source prior to being added into the mixture such that there is little or no heat or gas generated by a neutralization reaction when the phosphonate is added is preferred. In one embodiment, however, the detergent composition is phosphorous-free.

Examples of condensed phosphates include but are not limited to: sodium and potassium orthophosphate, sodium and potassium pyrophosphate, sodium tripolyphosphate, and sodium hexametaphosphate. A condensed phosphate may also assist, to a limited extent, in solidification of the detergent composition by fixing the free water present in the composition as water of hydration. A preferred builder is sodium tripolyphosphate anhydrous.

Phosphonic acids can be used in the form of water-soluble acid salts, particularly the alkali metal salts, such as sodium or potassium; the ammonium salts; or the alkylol amine salts where the alkylol has 2 to 3 carbon atoms, such as mono-, di-, or triethanolamine salts.

Examples of aminocarboxylic acid materials containing little or no NTA include, but are not limited to: N-hydroxyethylaminodiacetic acid, ethylenediaminetetraacetic acid (EDTA), hydroxyethylenediaminetetraacetic acid, diethylenetriaminepentaacetic acid, N-hydroxyethyl-ethylenediaminetriacetic acid (HEDTA), diethylenetriaminepentaacetic acid (DTPA), aspartic acid-N,N-diacetic acid (ASDA), methylglycinediacetic acid (MGDA), glutamic acid-N,N-diacetic acid (GLDA), ethylenediaminesuccinic acid (EDDS), 2-hydroxyethyliminodiacetic acid (HEIDA), iminodisuccinic acid (IDS), 3-hydroxy-2-2'-iminodisuccinic acid (HIDS) and other similar acids or salts thereof having an amino group with a carboxylic acid substituent. In one embodiment, however, the composition is free of aminocarboxylates.

Preferable levels of addition for builders that can also be chelating or sequestering agents are between about 0.1% to about 50% by weight, about 1% to about 50% by weight, about 1% to about 25% by weight, or about 1% to about 10% by weight. In addition, without being limited according to the invention, all ranges recited are inclusive of the numbers defining the range and include each integer within the defined range.

Water Conditioning Polymer

The alkaline ware washing composition can includes at least one water conditioning polymer. Water conditioning polymers can include but are not limited to: polycarboxylates or polycarboxylic acids and/or polyacrylates or polyacrylic acids. Exemplary polyacrylates and polycarboxylates that can be used as builders and/or water conditioning polymers include, but are not limited to: those having pendant carboxylate (—$CO_{2-}$) groups such as polyacrylic acid, maleic acid, maleic/olefin copolymer, sulfonated copolymer or terpolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, and hydrolyzed acrylonitrile-methacrylonitrile copolymers.

Other suitable water conditioning polymers include sugar or polyols comprising carboxylic acid or ester functional groups. Exemplary carboxylic acids include but are not limited to maleic, acrylic, methacrylic and itaconic acid or salts thereof. Exemplary ester functional groups include aryl, cyclic, aromatic and $C_1$-$C_{10}$ linear, branched or substituted esters. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein. These materials may also be used at substoichiometric levels to function as crystal modifiers.

Preferable levels of the water conditioning polymers include between about 1% to about 50% by weight, about 1% to about 40% by weight, about 1% to about 20% by weight, or about 1% to about 10% by weight. In addition, without being limited according to the invention, all ranges recited are inclusive of the numbers defining the range and include each integer within the defined range.

Nonionic Surfactants

The alkaline ware washing composition can include at least one nonionic surfactant. Suitable nonionic surfactants include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 (R-$(EO)_5(PO)_4$) and Dehypon LS-36 (R-$(EO)_3(PO)_6$); and capped alcohol alkoxylates, such as Plurafac LF221 and Tegoten EC11; mixtures thereof, or the like. In a preferred embodiment, the alkaline ware washing compositions include a block polyoxypropylene-polyoxyethylene polymer surfactant.

The semi-polar type of nonionic surfactants are another class of nonionic surfactant useful in alkaline ware washing compositions. Semi-polar nonionic surfactants include the amine oxides, phosphine oxides, sulfoxides and their alkoxylated derivatives. The treatise Nonionic Surfactants, edited by Schick, M. J., Vol. 1 of the Surfactant Science Series, Marcel Dekker, Inc., New York, 1983 provides further description of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch). Each of these references are herein incorporated by reference in their entirety.

Preferable levels of the nonionic surfactants include between about 0.1% to about 30% by weight, about 0.1% to about 25% by weight, about 1% to about 20% by weight, or about 1% to about 10% by weight. In addition, without being limited according to the invention, all ranges recited are inclusive of the numbers defining the range and include each integer within the defined range.

Additional Functional Ingredients

The alkaline ware washing compositions can further be combined with various functional components suitable for use in consumer and/or industrial ware wash applications. In some embodiments, the alkaline ware washing compositions including the alkalinity source, oxidized starch, nonionic surfactant, builders, and water conditioning agent(s), which make up a large amount, or even substantially all of the total weight of the composition. For example, in some embodiments few or no additional functional ingredients are disposed therein.

In other embodiments, additional functional ingredients may be included in the compositions. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning, specifically ware wash applications. However, other embodiments may include functional ingredients for use in other applications.

In other embodiments, the compositions may include additional builders, additional water conditioning agents, hardening agents, stabilizers, defoaming agents, anti-redeposition agents, bleaching agents, antimicrobial agents and/or sanitizers, solubility modifiers, dispersants, anticorrosion agents and metal protecting agents (i.e. anti-etch), stabilizing agents, corrosion inhibitors, enzymes, additional sequestrants and/or chelating agents, fragrances and/or dyes, rheology modifiers or thickeners, hydrotropes or couplers, buffers, solvents, solidifying agents and the like.

Hardening Agents

The following patents disclose various combinations of solidification, binding and/or hardening agents that can be utilized in the solid cleaning compositions of the present invention. The following U.S. patents are incorporated herein by reference: U.S. Pat. Nos. 7,153,820; 7,094,746; 7,087,569; 7,037,886; 6,831,054; 6,730,653; 6,660,707; 6,653,266; 6,583,094; 6,410,495; 6,258,765; 6,177,392; 6,156,715; 5,858,299; 5,316,688; 5,234,615; 5,198,198; 5,078,301; 4,595,520; 4,680,134; RE32,763; and RE32818.

Anticorrosion Agents

The alkaline ware washing compositions may optionally include an anticorrosion agent. Anticorrosion agents provide compositions that generate surfaces that are shinier and less prone to biofilm buildup than surfaces that are not treated with compositions having anticorrosion agents. Preferred anticorrosion agents which can be used according to the invention include phosphonates, phosphonic acids, triazoles, organic amines, sorbitan esters, carboxylic acid derivatives, sarcosinates, phosphate esters, zinc, nitrates, chromium, molybdate containing components, and borate containing components. The composition optionally includes an anticorrosion agent for providing enhanced luster to the metallic portions of a dish machine and/or providing shinier surfaces. When an anticorrosion agent is incorporated into the composition, it is preferably included in an amount of between about 0.01 wt-% and about 7.5 wt-%, between about 0.01 wt-% and about 5 wt-% and between about 0.01 wt-% and about 3 wt-%.

Antiredeposition Agents

The alkaline detergent compositions may also include an antiredeposition agent capable of facilitating sustained suspension of soils in a cleaning solution and preventing the removed soils from being redeposited onto the substrate being cleaned. Examples of suitable antiredeposition agents include fatty acid amides, complex phosphate esters, styrene maleic anhydride copolymers, and cellulosic derivatives such as hydroxyethyl cellulose, hydroxypropyl cellulose, and the like. The composition preferably includes from about 0.5 wt-% to about 10 wt-% and more preferably from about 1 wt-% to about 5 wt-% of an antiredeposition agent.

Enzymes

The alkaline ware washing compositions can include one or more enzymes, which can provide desirable activity for removal of protein-based, carbohydrate-based, or triglyceride-based soils from substrates such as flatware, cups and bowls, and pots and pans. Enzymes suitable for the inventive composition can act by degrading or altering one or more types of soil residues encountered on a surface thus removing the soil or making the soil more removable by a surfactant or other component of the cleaning composition. Both degradation and alteration of soil residues can improve detergency by reducing the physicochemical forces which bind the soil to the surface or textile being cleaned, i.e. the soil becomes more water soluble. For example, one or more proteases can cleave complex, macromolecular protein structures present in soil residues into simpler short chain molecules which are, of themselves, more readily desorbed from surfaces, solubilized, or otherwise more easily removed by detersive solutions containing said proteases.

Suitable enzymes include an amylase, a gluconase, a cellulase, a peroxidase, or a mixture thereof of any suitable origin, such as vegetable, animal, bacterial, fungal or yeast origin. In an embodiment, the enzyme does not include a lipase and/or protease which may degrade or inactivate the oxidized starch. In embodiments employing an enzyme the composition preferably includes from about 0.001 wt-% to about 10 wt-%, from about 0.01 wt-% to about 10 wt-%, from about 0.05 wt-% to about 5 wt-%, and more preferably from about 0.1 wt-% to about 3 wt-% of enzyme(s).

Foam Inhibitors

A foam inhibitor may be included in addition to the nonionic surfactants of the alkaline ware washing compositions for reducing the stability of any foam that is formed. Examples of foam inhibitors include silicon compounds such as silica dispersed in polydimethylsiloxane, fatty amides, hydrocarbon waxes, fatty acids, fatty esters, fatty alcohols, fatty acid soaps, ethoxylates, mineral oils, polyethylene glycol esters, polyoxyethylene-polyoxypropylene block copolymers, alkyl phosphate esters such as monostearyl phosphate and the like. A discussion of foam inhibitors may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein. The composition preferably includes from about 0 wt-% to about 5 wt-% and more preferably from about 0.01 wt-% to about 3 wt-% of the foam inhibitor.

Additional Surfactants

The compositions of invention may include additional surfactants. Particularly suitable surfactants include nonionic surfactants, amphoteric surfactants, and zwitterionic surfactants. In a preferred embodiment the compositions are substantially free of cationic and/or anionic surfactants. In an aspect, the compositions can include from about 0.01 wt-%-40 wt-% additional surfactants, preferably from about 0.1 wt-%-30 wt-% additional surfactant, more preferably from about 1 wt-%-25 wt-% additional surfactant. In addition, without being limited according to the invention, all ranges recited are inclusive of the numbers defining the range and include each integer within the defined range.

Method of Use—Ware Washing

In an embodiment, methods of using the solid 2-in-1 alkaline ware washing compositions involve using the steps of providing an alkaline 2-in-1 alkaline ware washing composition as disclosed herein. In an embodiment, a solid composition is inserted into a dispenser in or associated with a dish machine, including both industrial and/or consumer ware wash machines. Ware wash machines in various locations—consumer/home use, restaurants, hotels, care facilities, hospitals, fast food, etc.—are able to empty the solid 2-in-1 detergent compositions. In a particular embodiment, the solid compositions are easy to handle and do not require use of personal protective equipment (PPE). In some embodiments, the solid compositions are particularly well suited for use in an undercounter machine, where handling and dispensing present challenges for alkaline detergents. For example, undercounter machines are typically utilized in locations with minimal space so the solid concentrated, 2-in-1 compositions provide a unique benefit for such an application of use.

In an embodiment, the solid composition is a single-use solid composition. In another embodiment, the solid composition is a multiple-use dosage having between about 10 and about 10,000 doses per solid composition. In another aspect, the solid composition can be formulated in a single-use composition, where it is used one time in a wash. The methods also include forming a wash solution with the alkaline 2-in-1 detergent composition and water, contacting a soil on an article in the dish machine with the wash solution, removing the soil, and rinsing the article with potable water without requiring the use of a separate rinse aid composition. In embodiments, the rinse is with potable water only.

In an embodiment, the 2-in-1 detergent compositions are inserted into a dispenser of a dish machine. The dispenser may be selected from a variety of different dispensers depending of the physical form of the composition. The solid composition may be dispensed using a spray, flood, auger, shaker, tablet-type dispenser, unit dose using a water-soluble packet such as polyvinyl alcohol or foil pouch, or diffusion through a membrane or permeable surface. The dispenser may also be a dual dispenser in which one component, is dispensed on one side and another component is dispensed on another side. These exemplary dispensers may be located in or associated with a variety of dish machines including under the counter dish machines, bar washers, door machines, conveyor machines, or flight machines. The dispenser may be located inside the dish machine, remote, or mounted outside of the dishwasher. A single dispenser may feed one or more dish machines.

Once the 2-in-1 alkaline ware washing composition is inserted into the dispenser, the wash cycle of the dish machine is started and a wash solution is formed. The wash solution comprises the alkaline 2-in-1 alkaline ware washing composition and water from the dish machine. The water may be any type of water including hard water, soft water, clean water, or dirty water. The most preferred wash solution is one that maintains the preferred pH ranges of about 7 to about 11.5, more preferably about 9.5 to about 11.5, as measured by a pH probe based on a solution of the composition in a 16-gallon dish machine. The same probe may be used to measure millivolts if the probe allows for both functions, simply by switching the probe from pH to millivolts. The dispenser or the dish machine may optionally include a pH probe to measure the pH of the wash solution throughout the wash cycle. The actual concentration or water to detergent ratio depends on the particular surfactant used. Exemplary concentration ranges may include up to 2000 ppm, preferably 1 to 2000 ppm, more preferably 500 to 2000 ppm and most preferably 500 to 1500 ppm of the detergent composition in a use concentration.

The compositions may include concentrate compositions or may be diluted to form use compositions. In general, a concentrate refers to a composition that is intended to be diluted with water to provide a use solution that contacts an object to provide the desired cleaning, rinsing, or the like. The detergent composition that contacts the articles to be washed can be referred to as a concentrate or a use composition (or use solution) dependent upon the formulation employed in methods described herein.

A use solution may be prepared from the concentrate by diluting the concentrate with water at a dilution ratio that provides a use solution having desired detersive and rinsing properties. The water that is used to dilute the concentrate to form the use composition can be referred to as water of dilution or a diluent and can vary from one location to another. The typical dilution factor is between approximately 1 and approximately 10,000 but will depend on factors including water hardness, the amount of soil to be removed and the like. In an embodiment, the concentrate is diluted at a ratio of between about 1:10 and about 1:10,000 concentrate to water. Particularly, the concentrate is diluted at a ratio of between about 1:100 and about 1:5,000 concentrate to water. More particularly, the concentrate is diluted at a ratio of between about 1:250 and about 1:2,000 concentrate to water.

A use solution can have an elevated temperature (i.e. heated to an elevated temperature when used according to the methods of the invention. In one example, a use solution having a temperature between approximately 100° F. and about 185° F., between about 100° F. and approximately 130° F. or between about 110° F. and approximately 130° F. for low temperature applications, or between about 120° F. and approximately 185° F. or between about 140° F. and approximately 185° F. for high temperature applications, are contacted with the substrate to be cleaned.

After the wash solution is formed, the wash solution contacts a soil on an article in the dish machine. Examples of soils include soils typically encountered with food such as proteinaceous soils, hydrophobic fatty soils, starchy and sugary soils associated with carbohydrates and simple sugars, soils from milk and dairy products, fruit and vegetable soils, and the like. Soils can also include minerals, from hard water for example, such as potassium, calcium, magnesium, and sodium. Articles that may be contacted include articles made of glass, plastic, aluminum, steel, copper, brass, silver, rubber, wood, ceramic, and the like. Articles include things typically found in a dish machine such as glasses, bowls, plates, cups, pots and pans, bakeware such as cookie sheets, cake pans, muffin pans etc., silverware such as forks, spoons, knives, cooking utensils such as wooden spoons, spatulas, rubber scrapers, utility knives, tongs, grilling utensils, serving utensils, etc. The wash solution may contact the soil in a number of ways including spraying, dipping, sump-pump solution, misting and fogging.

Once the wash solution has contacted the soil, the soil is removed from the article. The removal of the soil from the article is accomplished by the chemical reaction between the wash solution and the soil as well as the mechanical action of the wash solution on the article depending on how the wash solution is contacting the article.

Once the soil is removed, the articles are rinsed as part of the dish machine wash cycle employing potable water without the use of a separate or additional rinse aid composition. In other embodiments, a rinse aid application containing a less than conventional amount of surfactant rinse aid is employed, as a result of the combination of the oxidized starch and the nonionic surfactant in the alkaline ware washing composition. In an embodiment, a rinse aid composition provides less than about 500 ppm surfactant; distinct from conventional rinse aid applications containing at least about 1500 ppm surfactant.

Beneficially, the methods of use provide effective 2-in-1 cleaning and rinsing without the alkaline ware washing composition imparting a visible layer or film or spotting on the treated ware as is conventionally found in alkaline detergent compositions employed without a rinse aid.

The methods can include more steps or fewer steps than laid out here. For example, the method can include additional steps normally associated with a dish machine wash cycle. For example, the method can also optionally include the use of an acidic detergent. For example, the method can optionally include alternating the acidic detergent with an alkaline detergent as described.

Method of Manufacturing the Composition

The compositions of the present invention are solid compositions, namely solid block compositions, pressed solid compositions, cast solid block compositions, or extruded solid block compositions.

Solid particulate materials can be made by merely blending the dry solid ingredients in appropriate ratios or agglomerating the materials in appropriate agglomeration systems. Pelletized materials can be manufactured by compressing the solid granular or agglomerated materials in appropriate pelletizing equipment to result in appropriately sized pelletized materials. Solid block and cast solid block materials can be made by introducing into a container either a prehardened block of material or a castable liquid that hardens into a solid block within a container. Preferred containers include disposable plastic containers or water-soluble film containers. Other suitable packaging for the composition includes flexible bags, packets, shrink wrap, and water-soluble film such as polyvinyl alcohol.

The solid detergent compositions may be formed using a batch or continuous mixing system. In an exemplary embodiment, a single- or twin-screw extruder is used to combine and mix one or more components at high shear to form a homogeneous mixture. In some embodiments, the processing temperature is at or below the melting temperature of the components. The processed mixture may be dispensed from the mixer by forming, casting or other suitable means, whereupon the detergent composition hardens to a solid form. The structure of the matrix may be characterized according to its hardness, melting point, material distribution, crystal structure, and other like properties according to known methods in the art. Generally, a solid detergent composition processed according to the method of the invention is substantially homogeneous with regard to the distribution of ingredients throughout its mass and is dimensionally stable.

In an extrusion process, the liquid and solid components are introduced into final mixing system and are continuously mixed until the components form a substantially homogeneous semi-solid mixture in which the components are distributed throughout its mass. The mixture is then discharged from the mixing system into, or through, a die or other shaping means. The product is then packaged. In an exemplary embodiment, the formed composition begins to harden to a solid form in between approximately 1 minute and approximately 3 hours. Particularly, the formed composition begins to harden to a solid form in between approximately 1 minute and approximately 2 hours. More particularly, the formed composition begins to harden to a solid form in between approximately 1 minute and approximately 20 minutes.

In a casting process, the liquid and solid components are introduced into the final mixing system and are continuously mixed until the components form a substantially homogeneous liquid mixture in which the components are distributed throughout its mass. In an exemplary embodiment, the components are mixed in the mixing system for at least approximately 60 seconds. Once the mixing is complete, the product is transferred to a packaging container where solidification takes place. In an exemplary embodiment, the cast composition begins to harden to a solid form in between approximately 1 minute and approximately 3 hours. Particularly, the cast composition begins to harden to a solid form in between approximately 1 minute and approximately 2 hours. More particularly, the cast composition begins to harden to a solid form in between approximately 1 minute and approximately 20 minutes.

In a pressed solid process, a flowable solid, such as granular solids or other particle solids including binding agents (e.g. hydrated chelating agent, such as a hydrated aminocarboxylate, a hydrated polycarboxylate or hydrated anionic polymer, a hydrated citrate salt or a hydrated tartrate salt, or the like together with an alkali metal carbonate) are combined under pressure. In a pressed solid process, flowable solids of the compositions are placed into a form (e.g., a mold or container). The method can include gently pressing the flowable solid in the form to produce the solid cleaning composition. Pressure may be applied by a block machine or a turntable press, or the like. Pressure may be applied at about 1 to about 2000 psi, about 1 to about 300 psi, about 5 psi to about 200 psi, or about 10 psi to about 100 psi. In certain embodiments, the methods can employ pressures as low as greater than or equal to about 1 psi, greater than or equal to about 2, greater than or equal to about 5 psi, or greater than or equal to about 10 psi. As used herein, the term “psi” or “pounds per square inch” refers to the actual pressure applied to the flowable solid being pressed and does not refer to the gauge or hydraulic pressure measured at a point in the apparatus doing the pressing. The method can include a curing step to produce the solid cleaning composition. As referred to herein, an uncured composition including the flowable solid is compressed to provide sufficient surface contact between particles making up the flowable solid that the uncured composition will solidify into a stable solid cleaning composition. A sufficient quantity of particles (e.g. granules) in contact with one another provides binding of particles to one another effective for making a stable solid composition. Inclusion of a curing step may include allowing the pressed solid to solidify for a period of time, such as a few hours, or about 1 day (or longer). In additional aspects, the methods could include vibrating the flowable solid in the form or mold, such as the methods disclosed in U.S. Pat. No. 8,889,048, which is herein incorporated by reference in its entirety.

The use of pressed solids provide numerous benefits over conventional solid block or tablet compositions requiring high pressure in a tablet press, or casting requiring the melting of a composition consuming significant amounts of energy, and/or by extrusion requiring expensive equipment and advanced technical know-how. Pressed solids overcome such various limitations of other solid formulations for which there is a need for making solid cleaning compositions. Moreover, pressed solid compositions retain its shape under conditions in which the composition may be stored or handled.

By the term “solid”, it is meant that the hardened composition will not flow and will substantially retain its shape under moderate stress or pressure or mere gravity. A solid may be in various forms such as a powder, a flake, a granule, a pellet, a tablet, a lozenge, a puck, a briquette, a brick, a solid block, a unit dose, or another solid form known to those of skill in the art. The degree of hardness of the solid cast composition and/or a pressed solid composition may range from that of a fused solid product which is relatively dense and hard, for example, like concrete, to a consistency characterized as being a hardened paste. In addition, the term “solid” refers to the state of the detergent composition under the expected conditions of storage and use of the solid detergent composition. In general, it is expected that the detergent composition will remain in solid form when exposed to temperatures of up to approximately 100° F. and particularly up to approximately 120° F.

The resulting solid composition may take forms including, but not limited to: a cast solid product; an extruded, molded or formed solid pellet, block, tablet, powder, granule, flake; pressed solid; or the formed solid can thereafter be ground or formed into a powder, granule, or flake. In an exemplary embodiment, pressed materials have a weight of between approximately 1 gram and approximately 250 grams, and solid block detergents formed by the composition have a mass of between approximately 1 and approximately 10 kilograms. The solid compositions provide for a stabilized source of functional materials. In some embodiments, the solid composition may be dissolved, for example, in an aqueous or other medium, to create a concentrated and/or use solution. The solution may be directed to a storage reservoir for later use and/or dilution or may be applied directly to a point of use.

In an aspect of the embodiments, the solid compositions are designed to release a certain portion or amount of the solid composition in each cycle. In an exemplary embodiment, a ware washing cycle releases about 0.5 grams of the solid composition per cycle, about 1 gram of the solid composition per cycle, about 2 grams of the solid composition per cycle, about 5 grams of the solid composition per cycle, about 6 grams of the solid composition per cycle, or about 10 grams of the solid composition per cycle (including all ranges therebetween). Accordingly, a skilled artisan will ascertain from the disclosure that the size of the solid composition can be suited for the number of cycles run on a daily basis (or other increment of time).

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The evaluated alkaline ware washing control (Detergent 1) and the alkaline ware washing composition (Detergent 2) are shown in Table 2 and the rinse additive is shown in Table 3.

TABLE 2

| | Detergent 1 (wt-%) | Detergent 2 (wt-%) |
|---|---|---|
| Phosphonobutane Tricarboxylic acid (PBTC) (50%) | 3 | 3 |
| Polyacrylic acid sodium salt | 4 | 4 |
| Sodium Hydroxide Beads | 65 | 63.5 |
| Pluronic N-3(Propoxy-Ethoxy N-3) | 2 | 2 |
| Sodium gluconate | 8 | 8 |
| Water | 15 | 12 |
| Oxidized Starch | 0 | 7.5 |

TABLE 3

| | Rinse Additive (wt-%) |
|---|---|
| C10-C16 ethoxylated alcohol | 4.2 |
| Polyoxyethylene polypropylene block polymer | 1.8 |
| Urea | 4 |
| Water | 90 |

Example 1

Sheeting and Drying Time on Treated Surfaces

The combination of oxidized starch and nonionic surfactants in the alkaline ware washing compositions (Detergent 2) was compared with alkaline ware washing compositions without the oxidized starch (Detergent 1; negative control) alone and in combination with a rinse additive (Rinse Additive) for efficacy in sheeting and drying time on various wares, including melamine and ceramic wares.

A dishmachine was thoroughly cleaned before use. Ceramic and melamine wares were selected for testing. The wares were cleaned with an alkali cleaner and air dried before testing. Then the dishmachine was prepared to operation status with water and temperature settings. The wash tank and rinse rank in dish machine were filled with water and heated to the desired temperature (different machine have different settings). The temperatures range for cleaning range from about 50-65 degrees C., and temperature range for rinsing is about 50-85 deg C. The compositions for cleaning and rinsing were set to a dispenser for the desired test concentrations as shown in the tables below. The ware were loaded into a dish rack in the machine and the timing for the drying speed recording was started. The same time rating for the sheeting scores for each ware were also recorded. For the test, drying speed timing finishes were when 95% of the ware's surface was dry (when there is no sheeting film but water drops formed on the surface, stops at 2 minutes and check the surface). The sheet scores were rated as follows: SCORE: (1) sheeting <20%; (2) 40%, (3) 60%, (4) 80%, and (5) 100%. The results are shown in Tables 4-5.

TABLE 4

| Melamine ware | | | | | | | | |
|---|---|---|---|---|---|---|---|---|
| | | Test 1 | Test 2 | Test 3 | Test 4 | Test 5 | Test 6 | Test 7 |
| Combination, use solution, ppm | Detergent 1 | 600 | 600 | 600 | — | — | — | |
| | Detergent 2 | — | — | — | 600 | 600 | 600 | 600 |
| | Rinse Additive | 500 | 1000 | 1500 | 500 | 1000 | 1500 | — |
| Performance response | Sheeting Score | 1 | 1 | 1 | 3 | 4 | 5 | 2-3 |
| | Drying Speed | >150 s | >120 s | >120 s | 60 s | 55 s | 45 s | 60 s |

TABLE 5

| Ceramic ware | | | | | | | | |
|---|---|---|---|---|---|---|---|---|
| | | Test 1 | Test 2 | Test 3 | Test 4 | Test 5 | Test 6 | Test 7 |
| Combination, use solution, ppm | Detergent 1 | 600 | 600 | 600 | — | — | — | |
| | Detergent 2 | — | — | — | 600 | 600 | 600 | 600 |
| | Rinse Additive | 500 | 1000 | 1500 | 500 | 1000 | 1500 | — |
| Performance response | Sheeting Score | 5 | 5 | 5 | 5 | 5 | 5 | 5 |
| | Drying Speed | 40-45 s | 40 s | 40 S | 40 s | 38 s | 38 s | 40-45 s |

The Detergent 2 functioning as a 2-in-1 detergent is one product having two functions, itself can performs cleaning and rinsing, with a sheet score of at least about 3 and a shortened drying time the better. The alkaline ware washing composition also shows it works well with a separate rinse additive, i.e. a separate second product to achieve premium sheeting and performance, with adding 1000 ppm surfactant or less. In the various embodiments shown in Tables 4-5, the alkaline ware washing composition achieves better sheeting and drying performance than the detergent without starch (Detergent 1) featuring normal rinse aid, on melamine wares. The performance on the ceramic ware substrates has good sheeting and drying performance with all combinations, since they are more hydrophilic than melamine. However, this demonstrates the alkaline ware washing compositions are suitable for use on various ware substrates.

In an embodiment, the alkaline ware washing compositions provide at least substantially similar performance includes both the cleaning/soil removal and rinsing (i.e. sheeting and drying time) in comparison to a conventional two-part system including both a first alkaline cleaning composition and a second separate rinse aid composition. In other embodiments, the substantially similar performance includes both the cleaning/soil removal and rinsing of the 2-in-1 alkaline ware washing compositions along with a slight amount (1000 ppm surfactant or less) of rinse aid following the ware washing composition in comparison to a conventional two-part system including both a first alkaline cleaning composition and a second separate rinse aid composition containing conventional amounts of the rinse aid surfactant.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A solid alkaline ware washing composition comprising:
- about 50 wt-% to about 80 wt-% of an alkalinity source, wherein the alkalinity source comprises an alkali metal hydroxide;
- an oxidized starch;
- about 1 wt-% to about 10 wt-% of at least one builder, wherein the builder comprises an alkali metal gluconate;
- about 1 wt-% to about 10 wt-% of a water conditioning polymer, wherein the water conditioning polymer comprises a polycarboxylate; and
- a nonionic surfactant;
- wherein the composition provides at least substantially similar cleaning, sheeting and drying as separate detergent and rinse aid compositions that do not include the oxidized starch.

2. The composition of claim 1, wherein the builder is sodium gluconate.

3. The composition of claim 1, wherein the alkalinity source is sodium hydroxide.

4. The composition of claim 1, wherein the oxidized starch is present from about 0.1 wt-% to about 30 wt-%.

5. The composition of claim 4, wherein the oxidized starch has starch glucoside units oxidized to carboxyl groups or carbonyl groups.

6. The composition of claim 4, wherein the oxidized starch has a molecular weight between about 500 and about 60,000 g/mol.

7. The composition of claim 1, wherein the water conditioning polymer is a polyacrylate.

8. The composition of claim 1, wherein the nonionic surfactant is present from about 0.1 wt-% to about 30 wt-%.

9. The composition of claim 8, wherein the nonionic surfactant is a block polyoxypropylene-polyoxyethylene polymer surfactant.

10. The composition of claim 1, further comprising at least one additional functional ingredient comprising an enzyme, neutralizing agent, anti-etch agent, anti-corrosion agent, solidification agent, antiredeposition agent, antimicrobial agent, foam inhibiting surfactant, or combinations thereof.

11. The composition of claim 10, wherein the additional functional ingredient is an enzyme, and wherein the enzyme is an amylase.

12. A method of cleaning and rinsing ware comprising:
- forming a wash solution comprising water and a solid alkaline ware washing composition comprising an oxidized starch, about 50 wt-% to about 80 wt-% of an alkalinity source, wherein the alkalinity source comprises an alkali metal hydroxide, about 1 wt-% to about 10 wt-% of at least one builder, wherein the builder comprises an alkali metal gluconate, about 1 wt-% to about 10 wt-% of a water conditioning polymer, wherein the water conditioning polymer comprises a polycarboxylate, and a nonionic surfactant;
- contacting ware with said wash solution;
- rinsing said ware with water;
- wherein said wash solution provides at least substantially similar cleaning, sheeting and drying as separate detergent and rinse aid compositions that do not include the oxidized starch; and
- optionally wherein the ware comprises melamine, glass and/or ceramic.

13. The method of claim 12, wherein the nonionic surfactant is present from about 1 wt-% to about 20 wt-% of the solid alkaline ware washing composition.

14. The method of claim 12, wherein the alkalinity source comprises sodium hydroxide, wherein the builder comprises sodium gluconate, wherein the water conditioning polymer comprises a polyacrylate, and wherein the nonionic surfactant comprises a block polyoxypropylene-polyoxyethylene polymer surfactant.

15. The method of claim 12, wherein the wash solution comprising water and a solid alkaline ware washing composition has an active concentration between about 500 ppm to about 1500 ppm, and/or wherein the method does not include a separate rinse additive or rinse aid composition or includes a rinse additive or rinse aid composition providing no more than about 1000 ppm surfactant, or no more than about 500 ppm surfactant.

16. The method of claim 12, wherein the wash solution does not impart a visible layer, filming and/or spotting on the treated ware.

17. The method of claim 12, wherein the wash solution provides substantially similar cleaning performance to a two-part detergent and rinse aid composition that does not contain the oxidized starch, and/or wherein the solid alkaline ware washing composition is a single use or a multi-use solid composition, and wherein the solid alkaline ware washing composition is a pressed solid, cast solid, or extruded solid.

* * * * *